United States Patent [19]

Andrews

[11] 4,115,29(

[45] Sep. 19, 197!

[54] POLYHALOCARBOXYLIC ACID SALTS AS ACCELERATORS FOR CURING EPOXIDE RESINS

[75] Inventor: Christopher Michael Andrews, Cambridge, England

[73] Assignee: Ciba-Geigy Corporation, Ardsley, N.Y.

[21] Appl. No.: 751,227

[22] Filed: Dec. 16, 1976

[30] Foreign Application Priority Data

Dec. 30, 1975 [GB] United Kingdom ............... 53103/75

[51] Int. Cl.$^2$ ............................................. C08G 59/40
[52] U.S. Cl. ...................................... 528/92; 252/182; 260/30.2; 260/30.4 EP; 260/33.2 EP; 260/33.4 EP; 260/830 TW; 528/93; 528/95; 528/273; 528/366; 528/18 R; 528/410; 528/412; 528/413; 528/414; 528/409; 528/418; 528/421; 528/231; 528/97; 528/99; 526/47; 526/47.6; 526/49

[58] Field of Search ............ 260/47 EC, 2 EC, 78.41 260/47 EA, 30.4 EP, 30.2, 33.2 EP, 33.4 EF 252/18

[56] References Cited

U.S. PATENT DOCUMENTS

| | | | |
|---|---|---|---|
| 3,183,281 | 5/1965 | Clemens | 260/83 |
| 3,586,616 | 6/1971 | Kropp | 204/159.1 |
| 3,678,004 | 7/1972 | Meyers et al. | 260/47 E( |
| 4,026,862 | 5/1977 | Smith et al. | 260/37 E] |

*Primary Examiner*—Harold D. Anderson
*Assistant Examiner*—E. A. Nielsen
*Attorney, Agent, or Firm*—Vincent J. Cavalieri; Josepl F. DiPrima

[57] ABSTRACT

To accelerate the curing of epoxide resins by particula curing agents, i.e., polyamines, polyaminoamides, poly carboxylic acids, or polycarboxylic acid anhydrides there is employed an aliphatic or araliphatic monocai boxylic acid group at least two halogen atoms chose from fluorine and chlorine atoms, or a salt thereof, suc as magnesium trifluoroacetate and magnesium trichloi oacetate.

13 Claims, No Drawings

POLYHALOCARBOXYLIC ACID SALTS AS ACCELERATORS FOR CURING EPOXIDE RESINS

BACKGROUND OF THE INVENTION

This invention relates to compositions for curing epoxide resins, to curable mixtures of these compositions and epoxide resins, and to cured products obtained by curing the aforesaid mixtures.

It is known that epoxide resins, i.e., substances containing on average more than one 1,2-epoxide group per molecule, may be cured by reaction with various classes of substances to form cross-linked, infusible, insoluble products having valuable technical properties. Typical curing agents include aromatic, aliphatic, heterocyclic, and cycloaliphatic polyamines and polyaminoamides, and polycarboxylic acids and their anhydrides. Some of these agents are suitable for curing at room temperature whilst others are suitable only at elevated temperatures. The chief drawback with curing agents at present in use is that they often cure the resin only slowly. The use of accelerators alleviates this drawback to some extent but the accelerating effect which the accelerators presently employed impart is relatively modest, particularly when amine curing agents are employed.

United States Patent Specification No. 3278305 discloses a process for the photochemical crosslinking of polymers which comprises exposing to actinic light selected portions of a photo-sensitive mixture containing a polymeric material carrying groups which are reactive with photochemically formed isocyanates and a polycarboxylic acid azide capable of forming crosslinks with the polymeric material. Among the polymeric materials mentioned are epoxide resins. It is stated that, under the influence of light, the polycarboxylic acid azides are probably converted into polyisocyanates. Compounds which are known to accelerate the photochemical conversion of the acid azide group into an isocyanate group, such as trichloroacetic acid, may be added to the photosensitive composition.

We have now found that certain fluorinated or chlorinated carboxylic acids and their salts very markedly accelerate the cure of epoxide resins by polyamines, polyaminoamides, polycarboxylic acids, and polycarboxylic acid anhydrides.

One aspect of this invention therefore comprises compositions, suitable for use as a curing agent for epoxide resins, consisting of a. a polyamine, a polyaminoamide, a polycarboxylic acid, or a polycarboxylic acid anhydride, and b. an aliphatic or araliphatic monocarboxylic acid of 2 to 8 carbon atoms, bearing on the carbon atom adjacent to the carboxyl group at least two halogen atoms chosen from fluorine and chlorine atoms, or a salt thereof.

Another aspect of this invention comprises a curable composition consisting of a. a polyamine, a polyaminoamide, a polycarboxylic acid, or a polycarboxylic acid anhydride, b. an aliphatic or araliphatic monocarboxylic acid of 2 to 8 carbon atoms, bearing on the carbon atom adjacent to the carboxyl group at least two halogen atoms chosen from fluorine and chlorine atoms, or a salt thereof, and c. an epoxide resin.

A further aspect of this invention comprises a process for curing an epoxide resin which consists of forming a mixture of the epoxide resin, an effective (i.e., curing) amount of a polyamine, a polyaminoamide, a polycarboxylic acid, or a polycarboxylic acid anhydride as curing agent therefor, and an aliphatic or araliphatic monocarboxylic acid of 2 to 8 carbon atoms, bearing on the carbon atom adjacent to the carboxyl group at least two halogen atoms chosen from fluorine and chlorine atoms, or a salt thereof, and allowing or causing the mixture to cure.

The preferred halogenated acids are fluorinated or chlorinated, especially perfluorinated or perchlorinated, saturated aliphatic acids of from 2 to 6 carbon atoms, more particularly of from 2 to 4 carbon atoms, such as dichloroacetic, α,α-dichloropropionic, perfluoropropionic, and perfluoro-n-butyric acids. Trifluoroacetic acid and trichloroacetic acid are especially preferred.

The salt of the halogenated acid may be those of light or heavy metals, i.e., of metals of Groups IA, IB, IIA, IIB, IIIB, IVB, VB, VIB, VIIB, or VIII of the Periodic Table (as shown on p. 60–61 in Handbook of Chemistry, ed. Lange, Revised Tenth Edition, published by McGraw-Hill). The metals may be trivalent, e.g., chromic chromium, but preferably they are mono- or divalent, such as lithium, sodium, calcium, zinc, barium, copper, cobalt, nickel, manganese, vanadyl vanadium ($VO^{2+}$), and magnesium, the lithium, sodium, calcium, and magnesium salts being particularly preferred for use with aromatic amines and the zinc, manganese, vanadyl, and magnesium salts being particularly preferred for use with aliphatic amines.

The salts may also be ammonium salts, including quaternary ammonium salts, or amine salts such as those of aromatic, aliphatic, or heterocyclic amines, preferably those amines having a basic strength, - log $K_1$, of 5 or less. Typical such amines include mono-, di-, and tri-methylamine, mono-, di-, and tri-ethylamine, ethanolamine, the butylamines, enzylamine, 2-phenylethylamine, N,N-dimethylbenzylamine, ethylenediamine, piperazine, piperidine, bis(4-aminophenyl)methane, 3-ethyl-4,4'-diaminodiphenylmethane, and bis(3-ethyl-4-aminophenyl)methane.

Epoxide resins which may be employed in these compositions are preferably those containing groups of formula

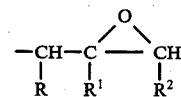

directly attached to atoms of oxygen, nitrogen, or sulphur, where either R and $R^2$ each represent a hydrogen atom, in which case $R^1$ denotes a hydrogen atom or a methyl group, or R and $R^2$ together represent —$CH_2CH_2$—, in which case $R^1$ denotes a hydrogen atom.

As examples of such resins may be mentioned polyglycidyl and poly(β-methylglycidyl) esters obtainable by reaction of a compound containing two or more carboxylic acid groups per molecule with epichlorohydrin, glycerol dichlorohydrin, or β-methylepichlorohydrin in the presence of an alkali. Such polyglycidyl esters may be derived from aliphatic polycarboxylic acids, e.g., oxalic acid, succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hexahydrophthalic acid, and 4-methylhexahydrophhalic acid; and from aromatic polycarboxylic acids such as phthalic acid, isophthalic acid, and terephthalic acid.

Further examples are polyglycidyl and poly($\beta$-methylglycidyl) ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene) glycols, propane-1,2-diol and poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol, sorbitol, and poly(epichlorohydrin); from cycloaliphatic alcohols such as resorcitol, quinitol, bis(4-hydroxycyclohexyl)methane, 2,2-bis(4-hydroxycyclohexyl)-propane, and 1,1-bis(hydroxymethyl)cyclohex-3-ene; and from alcohols having aromatic nuclei, such as N,N-bis(2-hydroxyethyl)aniline and p,p'-bis(2-hydroxyethylamino)diphenylmethane. Or they may be made from mononuclear phenols, such as resorcinol and hydroquinone, and from polynuclear phenols, such as bis(4-hydroxyphenyl)methane, 4,4'-dihydroxydiphenyl, bis(4-hydroxyphenyl) sulphone, 1,1,2,2-tetrakis(4-hydroxyphenyl)-ethane, 2,2-bis(4-hydroxyphenyl)propane (otherwise known as bisphenol A), 2,2-bis(3,5-dibromo-4-hydroxyphenyl)propane, and novolaks formed from aldehydes such as formaldehyde, acetaldehyde, chloral, and furfuraldehyde, with phenols such as phenol itself, and phenol substituted in the ring by chlorine atoms or by alkyl groups each containing up to nine carbon atoms, such as 4-chlorophenol, 2-methylphenol, and 4-tert.butylphenol.

Poly(N-glycidyl) compounds include, for example, those obtained by dehydrochlorination of the reaction products of epichlorohydrin with amines containing at least two amino-hydrogen atoms such as aniline, n-butylamine, bis(4-aminophenyl)methane, and bis(4-methylaminophenyl)methane; triglycidyl isocyanurate; and N,N'-diglycidyl derivatives of cyclic alkylene ureas, such as ethyleneurea and 1,3-propyleneurea, and of hydantoins such as 5,5-dimethylhydantoin.

Examples of poly(S-glycidyl) compounds are di-S-glycidyl derivatives of dithiols such as ethane-1,2-dithiol and bis(4-mercaptomethylphenyl) ether.

Examples of epoxide resins having groups of formula I where R and $R^2$ conjointly denote a —$CH_2CH_2$— group are bis(2,3-epoxycyclopentyl) ether, 2,3-epoxycyclopentyl glycidyl ether, and 1,2-bis(2,3-epoxycyclopentyloxy)ethane.

Epoxide resins having the 1,2-epoxide groups attached to different kinds of hetero atoms may be employed, e.g., the N,N,O— triglycidyl derivative of 4-aminophenol, the glycidyl ether-glycidyl ester of salicylic acid, N-glycidyl-N'-(2-glycidyloxypropyl)-5,5-dimethylhydantoin, and 2-glycidyloxy-1,3-bis(5,5-dimethyl-1-glycidylhydantoin-3-yl)propane.

Epoxide resins in which some or all of the epoxide groups are not terminal may also be employed, such as vinylcyclohexene dioxide, limonene dioxide, dicyclopentadiene dioxide, 4-oxatetracyclo [6,2.1.0$^{2,7}$.0$^{3,5}$] undec-9-yl glycidyl ether, the bis(4-oxatetracyclo [6.2.1.0$^{2,7}$.0$^{3,5}$]undec-9-yl) ether of ethylene glycol, 3,4-epoxycyclohexylmethyl 3',4'-epoxycyclohexanecarboxylate and its 6,6'-dimethyl derivative, the bis(3,4-epoxycyclohexanecarboxylate) of ethylene glycol, 3-(3,4-epoxycyclohexyl)-8,9-epoxy-2,4-dioxaspiro [5,5] undecane, and epoxidised butadienes of copolymers of butadiene with ethylenic compounds such as styrene and vinyl acetate.

If desired, a mixture of epoxide resins may be used.

Preferred epoxide resins are polyglycidyl ethers, polyglycidyl esters, and N,N'-diglycidylhydantoins. Specific preferred resins are polyglycidyl ethers of 2,2-bis(4-hydroxyphenyl)propane, of bis(4-hydroxyphenylmethane, or of a novolak formed from formaldehyde and phenol, or phenol substituted in the ring by one chlorine atom or by one alkyl hydrocarbon group containing from one to nine carbon atoms, and having a 1,2-epoxide content of more than 0.5 equivalent per kilogram.

As examples of polyamines suitable for use as the curing agent may be mentioned aliphatic, cycloaliphatic, aromatic, and heterocyclic amines such as m- and p-phenylenediamine, bis(4-aminophenyl)methane, anilineformaldehyde resins, bis(4-aminophenyl) sulphone, ethylenediamine, propane-1,2-diamine, propane-1,3-diamine, N,N-diethylethylenediamine, hexamethylenediamine, diethylenetriamine, triethylenetetramine, tetraethylenepentamine, N-(2-hydroxyethyl)-, N-(2-hydroxypropyl)-, and N-(2-cyanoethyl)diethylenetriamine, 2,2,4-trimethylhexane-1,6-diamine, 2,4,4-trimethylhexane-1,6-diamine, m-xylylenediamine, N,N-dimethyl- and N,N-diethylpropane-1,3-diamine, bis(4-aminocyclohexyl)methane, 2,2-bis(4-aminocyclohexyl)-propane, 2,2-bis(4-amino-3-methylcyclohexyl)-propane, 3-aminomethyl-3,5,5-trimethylcyclohexylamine (isophoronediamine), and N-(2-aminoethyl)piperazine, and adducts of such polyamines with a stoichiometric deficit of a polyepoxide such as a diglycidyl ether. Suitable polyaminoamides include those prepared from aliphatic polyamines and dimerised or trimerised unsaturated fatty acids. Suitable polycarboxylic acids and their anhydrides include phthalic anhydride, tetrahydro- and hexahydro-phthalic anhydride, methylendomethylenetetrahydrophthalic anhydride, nonenylsuccinic anhydride, dodecenylsuccinic anhydride, hexachloroendomethylenetetrahydrophthalic anhydride and endomethylenetetrahydrophthalic anhydride and their mixtures, maleic anhydride, succinic anhydride, pyromellitic acid dianhydride, benzophenone-3,3',4,4'-tetracarboxylic acid dianhydride, polysebacic anhydride, polyazelaic anhydride, the acids corresponding to the afore-mentioned anhydrides, and also isophthalic acid, terephthalic acid, citric acid, and mellitic acid. Particularly preferred polycarboxylic acid or anhydride curing agents are those which, in admixture if necessary, are liquid at temperatures below 60° C.

The preferred curing agents are polyamines, especially aromatic polyamines.

An effective amount of the curing agent is employed. The proportion will depend on the chemical nature of the curing agent and the properties sought of the curable composition and its cured product; the optimum proportion can readily be determined by methods familiar to those skilled in the art. By way of illustration, however, when the curing agent is an amine there will normally be used from about 0.75 to 1.25 amino-hydrogen equivalents of the amine per 1,2-epoxy equivalent of the epoxide resin. When polycarboxylic acids or their anhydrides are used, usually from about 0.4 to 1.1 carboxylic acid, or carboxylic acid anhydride, equivalents are taken per 1,2-epoxy equivalent.

The amount of the accelerator (b), too, may vary according to such factors as those just mentioned, but usually from 0.2 to 2 parts by weight are employed per 100 parts of the combined weights of the epoxide resin and the curing agent.

The accelerator is best incorporated dissolved in an inert organic solvent such as 2-methoxyethanol, ethylene glycol, diethylene glycol, N-methylpyrrolidone, γ-butyrolactone, benzyl alcohol, dibutyl phthalate, butane-1,4-diol, or ethyl methyl ketone.

Curing can be carried out, depending on the nature of the curing agent, at room temperature (say, 18 to 25° C) or lower (e.g. 0° to 5° C) or at higher temperatures (50° to 180° C, for example).

The new compositions may further contain suitable plasticizers such as dibutyl phthalate, dioctyl phthalate, and tricresyl phosphate, inert diluents such as tars and bitumen and so-called reactive diluents, especially monoepoxides such as n-butyl glycidyl ether, iso-octyl glycidyl ether, phenyl glycidyl ether, cresyl glycidyl ethers, glycidyl esters of tertiary, aliphatic, monocarboxylic acids, glycidyl acrylate, and glycidyl methacrylate. They may also contain additives such as fillers, reinforcing materials, colouring matter, flow control agents, flame inhibitors, and mould lubricants. Suitable extenders, fillers, and reinforcing materials are, for example, glass fibres, carbon fibres, ballotini, mica, quartz flour, calcium carbonate, cellulose, kaolin, wollastonite, colloidal silica having a large specific surface area, powdered poly(vinyl chloride), and powdered polyolefin hydrocarbons such as polyethylene and polypropylene.

The curable compositions of this invention may be used as laminating resins, paints and lacquers, sinter powders, impregnating and casting resins, moulding compositions, putties and sealing compounds, potting and insulating compounds for the electrical industry, and adhesives, and also in the manufacture of such products.

They may be supplied as a two-part pack, one part containing the epoxide resin and the other the curing agent, the accelerator being in either or both parts, but advantageously only in the curing agent part, because some epoxide resins tend to polymerise slowly, over a period of some months, when kept in contact with the halogenated acid or its salts at room temperature.

The following Examples illustrate the invention. Temperatures are in degrees Celsius and, unless otherwise specified, parts are by weight. The accelerating effect is shown, as is conventional in this art, by the reduction in the time taken for the composition to gel, prior to curing; gelation times were determined by means of a "Techne" gelation timer, available from Techne (Cambridge) Ltd., Duxford, Cambridge, England.

The salts were prepared by any of the following methods:

a. The acid was mixed with 10 parts by volume of water and the ammonium, amine, or metal carbonate was added to bring the pH to 7. If the carbonate was insoluble in water, an excess over the theoretical amount was added and, when effervescence ceased, the excess was filtered off.

The resultant solution was evaporated, and the salt was dried, at 100°/13 mm Hg.

b. The amine, ammonium, or metal nitrate was dissolved in ethanol and treated with an equivalent of the barium salt of the acid, also dissolved in ethanol. Barium nitrate precipitated from solution and was filtered off. The solution was evaporated and the product was dried as above.

c. The amine, ammonium, or metal sulphate was dissolved in water and treated with an equivalent of the barium salt of the acid, dissolved in water. Barium sulphate precipitated and was filtered off. The solution was evaporated and the product was dried as above.

"Epoxide resin I" denotes a polyglycidyl ether of 2,2-bis(4-hydroxyphenyl)propane having a 1,2-epoxide content of 5.16 equivalents per kilogram and a viscosity at 21° of 245 poises.

"Epoxide resin II" denotes the diglycidyl ether of butane-1,4-diol.

"Epoxide resin III" denotes N,N'-diglycidyl-5,5-dimethylhydantoin.

"Epoxide resin IV" denotes N-glycidyl-N'-(2-glycidyloxypropyl)-5,5-dimethylhydantoin.

"Epoxide resin V" denotes the tetraglycidyl ether of pentaerythritol, advanced with 2,2-bis(4-hydroxyphenyl)propane to an epoxide content of 8.5 equiv./kg.

"Epoxide resin VI" denotes diglycidyl tetrahydrophthalate; its 1,2-epoxide content was 6.0 equiv./kg.

"Epoxide resin VII" denotes the tetrakis(N-glycidyl) derivative of bis(4-aminophenyl)methane.

"Epoxide resin VIII" denotes 3,4-epoxycyclohexylmethyl 3',4'-epoxycyclohexanecarboxylate.

"Hardener I" denotes a commercially available liquid curing agent, composed essentially of bis(4-aminophenyl)methane.

"Hardener II" denotes triethylenetetramine.

"Hardener III" denotes a 54% solution of bis(4-aminophenyl)methane in γ-butyrolactone.

"HardenerIV" denotes bis(4-amino-3-methylcyclohexyl)methane.

"Hardener V" denotes a polyaminoamide made from dimerised linoleic acid and triethylenetetramine, and is described as Sample 3 of Example 2 in British Patent Specification No. 847028.

"Hardener VI" denotes hexahydrophthalic anhydride.

EXAMPLE 1

Epoxide resin I (50 g) was mixed at room temperature with Hardener I (16 g). The gel time was 2682 minutes. Next, the experiment was repeated, incorporating in each case 0.5 g of a 50% solution of a trifluoroacetate or a trichloroacetate in 2-methoxyethanol, and the corresponding gel times were recorded.

Table I shows the results obtained.

TABLE I

| Salt | Gel Time (minutes) with | |
|---|---|---|
| | trifluroacetate | trichloroacetate |
| $Mg^{2+}$ | 22 | 19 |
| $Li^+$ | 561 | 813 |
| $Na^+$ | 51 | — |
| $NH_4^+$ | 1226 | 1253 |
| $Ca^{2+}$ | 704 | 756 |
| $Ba^{2+}$ | 1391 | 1453 |
| $Zn^{2+}$ | 90 | 155 |
| $Ni^{2+}$ | 594 | 1004 |
| $Cu^{2+}$ | 755 | 769 |
| $Co^{2+}$ | 193 | 247 |
| $Mn^{2+}$ | 31 | 31 |
| $VO^{2+}$ | 29 | 190 |
| $Cr^{3+}$ | 1211 | 1590 |

EXAMPLE 2

The procedure of Example 1 was repeated, but Hardener I was replaced by Hardener II (6 g). The gel time for the unaccelerated mixture was 54 minutes. The results for the accelerated mixes are shown in Table II.

TABLE II

| Salt | Gel time (minutes) with | |
|---|---|---|
| | trifluoroacetate | trichloroacetate |
| $Mg^{2+}$ | 29 | 38 |
| $Li^+$ | 34 | 36 |
| $Na^+$ | 36 | 38 |
| $Ca^{2+}$ | — | 33 |
| $Cu^{2+}$ | 34 | 3b |

EXAMPLE 3

The procedure of Example 1 was repeated, using various epoxide resins and hardeners. Magnesium trifluoroacetate and trichloroacetate, added as 50% solutions in 2-methoxyethanol (0.5 g) were incorporated as accelerators. The results are given in Table III.

TABLE III

| Resin | | Hardener | | Gel time (minutes) with accelerator | | |
|---|---|---|---|---|---|---|
| Type | g | Type | g | None | Trifluoro-acetate | Trichloroacetate |
| II | 50 | I | 22.8 | 8075 | 25 | 2650 |
| III | 35 | I | 21 | 4570 | 84 | 891 |
| IV | 15 | | | | | |
| V | 50 | I | 20 | 3436 | 161 | 14 |
| VI | 50 | I | 19.6 | 4580 | 47 | 68 |
| VII | 50 | III | 38.5 | 6159 | 2011 | 2539 |
| VIII | 50 | I | 22 | >75000 | 5856 | 736 |
| I | 50 | IV | 16 | 428 | 16 | 176 |
| I | 50 | V | 25 | 343 | 165 | 218 |

EXAMPLE 4

Epoxide resin I (50 g) and Hardener VI (37.5 g) were mixed together at 120°: they gelled after 2358 minutes at 120°. A similar mixture, containing also 0.5 g of a 50% solution of magnesium trifluoroacetate in 2-methoxyethanol, gelled after 1298 minutes, and one containing 0.5 g of a 50% solution of magnesium trichloroacetate in 2-methoxyethanol gelled after 505 minutes, both mixtures being maintained at 120°.

EXAMPLE 5

Example 1 was repeated, the solutions of haloacetate salts being replaced by 0.5 g of a 50% solution in 2-methoxyethanol of magnesium salts of other halogenated acids. The resultant gel times were as follows:

| magnesium heptafluoro-n-butyrate | 58 minutes |
|---|---|
| magnesium pentafluoropropionate | 19 minutes |
| magnesium dichloroacetate | 71 minutes |
| magnesium α,α-dichloropropionate | 39 minutes |

EXAMPLE 6

Example 2 was repeated, the solutions of haloacetate salts being replaced by 0.5 g of a 50% solution in 2-methoxyethanol of magnesium salts of other halogenated acids. The resultant gel times were as follows:

| magnesium heptafluoro-n-butyrate | 33 minutes |
|---|---|
| magnesium pentafluoropropionate | 38 minutes |
| magnesium dichloroacetate | 39 minutes |
| magnesium pentadecafluoro-octanoate | 38 minutes |

EXAMPLE 7

Example 1 was repeated, the haloacetate salt accelerators being replaced by 0.25 g of trifluoroacetic acid. The gel time was 257 minutes.

EXAMPLE 8

In this Example, the efficacy of the accelerators of this invention is compared with those of conventional accelerators.

A mixture comprising 87% of Epoxide resin I and 13% of iso-octyl ether (50 g) was mixed at room temperature with Hardener I (16 g). The gel time at room temperature was 2507 minutes.

The experiment was repeated, using two conventional accelerators. When 2-methoxyethyl hydrogen maleate (0.5 g) was incorporated, the corresponding gel time was 379 minutes; when salicylic acid (0.5 g) was incorporated, the gel time at room temperature was 117 minutes.

Finally, the experiment was repeated with 0.5 g of a 50% solution of magnesium trichloroacetate in 2-methoxyethanol incorporated. The gel time at room temperature was only 15 minutes.

I claim:
1. A composition comprising
   a. a curing agent for epoxide resins, which is a polyamine, a polyaminoamide, a polycarboxylic acid, or a polycarboxylic anhydride, and
   b. a lithium, sodium, calcium, zinc, barium, copper, cobalt, nickel, manganese, vanadyl vanadium, chromic chromium, or magnesium salt of an aliphatic or araliphatic monocarboxylic acid of 2 to 8 carbon atoms, bearing on the carbon atom adjacent to the carboxyl group at least two halogen atoms chosen from fluorine and chlorine atoms.
2. The composition of claim 1, in which (b) is a saturated aliphatic acid or a salt thereof.
3. The composition of claim 1, in which (b) is a perfluorinated or perchlorinated acid or a salt thereof.
4. The composition of claim 1, in which (b) is dichloroacetic acid, α,α-dichloropropionic acid, perfluoropropionic acid, perfluoro-n-butyric acid, trifluoroacetic acid, or trichloroacetic acid, or a salt thereof.
5. The composition of claim 1, in which (b) is dissolved in an inert organic solvent.
6. The composition of claim 5, in which the said solvent is 2-methoxyethanol, ethylene glycol, diethylene glycol, N-methylpyrrolidone, γ-butyrolactone, benzyl alcohol, dibutyl phthalate, butane-1,4-diol, or ethyl methyl ketone.
7. The composition of claim 1, in which the curing agent (a) is an aromatic polyamine.
8. The composition of claim 1, which further contains (c) an epoxide resin.
9. The composition of claim 8, in which the epoxide resin (c) contains, per average molecule, at least one group of the formula

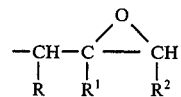

directly attached to an atom of oxygen, nitrogen, or sulfur, where either R and $R^2$ each represent a hydrogen atom, in which case $R^1$ denotes a hydrogen atom or a methyl group, or R and $R^2$ together represent —CH$_2$CH$_2$—, in which case $R^1$ denotes a hydrogen atom.

10. The composition of claim 8, in which the epoxide resin (c) is a polyglycidyl ester, a polyglycidyl ether, or an N,N'-diglycidylhydantoin.

11. The composition of claim 8, containing from 0.2 to 2 parts by weight of the component (b) per 100 parts of the combined weights of the curing agent (a) and the epoxide resin (c).

12. A two part pack, the components of which, on mixing, form the composition of claim 8, one part containing the curing agent (a) and the other part the epoxide resin (c), at least one part containing the component (b).

13. The product obtained by allowing or causing to cure the composition of claim 8.

* * * * *